Oct. 31, 1967   B. J. SHEARER   3,349,504
REMOVABLE COVERING FOR WOMEN'S SHOES
AND METHOD OF FORMING IT
Filed June 11, 1965   6 Sheets-Sheet 1
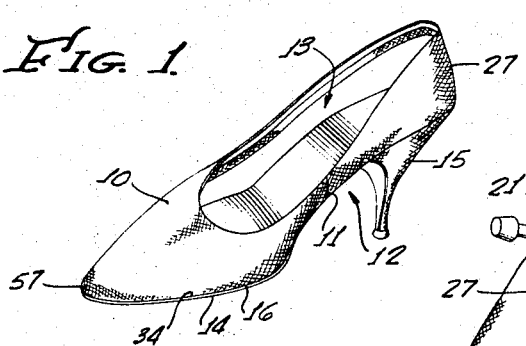
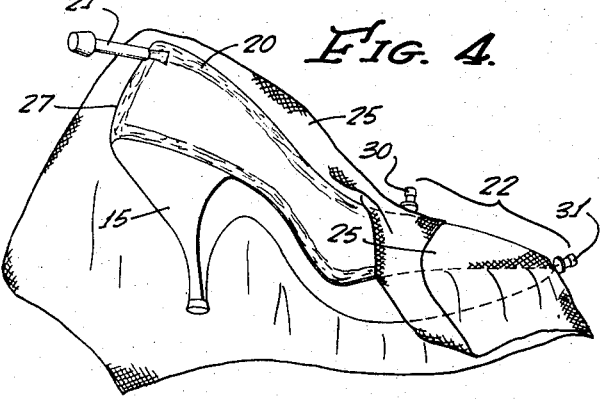
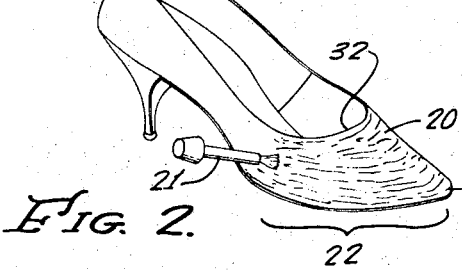
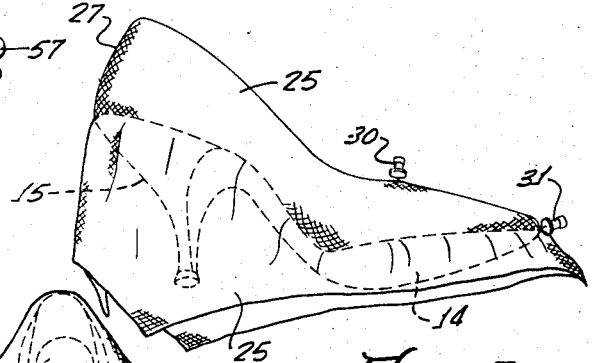
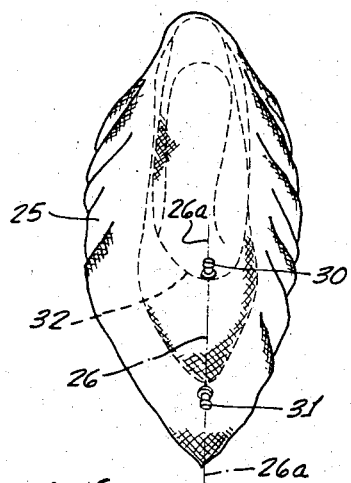
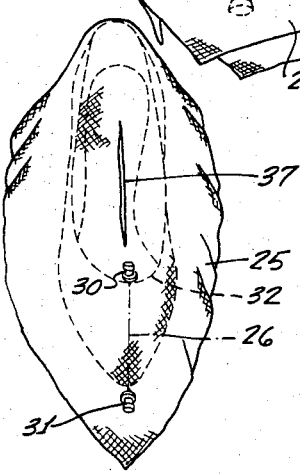
INVENTOR.
BETTE J. SHEARER
BY FOWLER, KNOBBE & GAMBRELL
ATTORNEYS.

Oct. 31, 1967
B. J. SHEARER
3,349,504
REMOVABLE COVERING FOR WOMEN'S SHOES
AND METHOD OF FORMING IT
Filed June 11, 1965
6 Sheets-Sheet 2
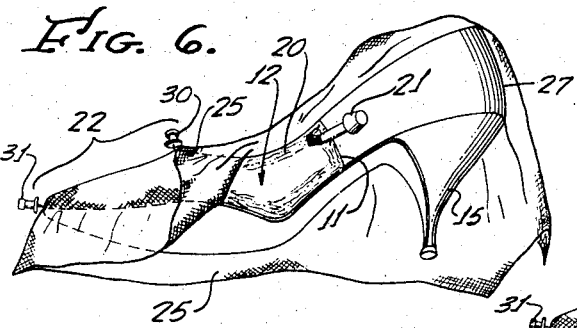
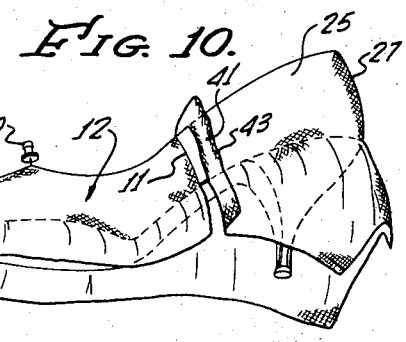
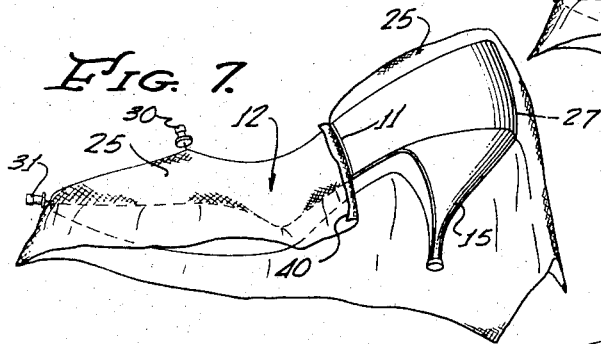
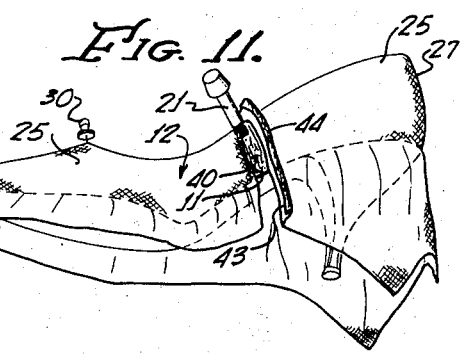
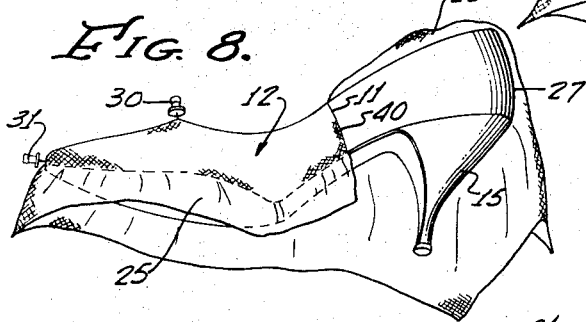
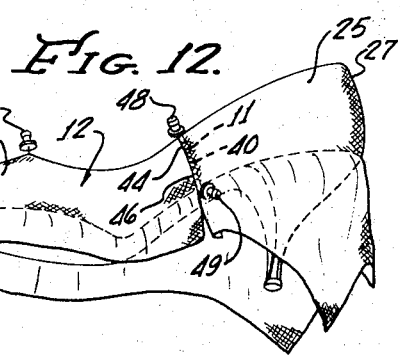
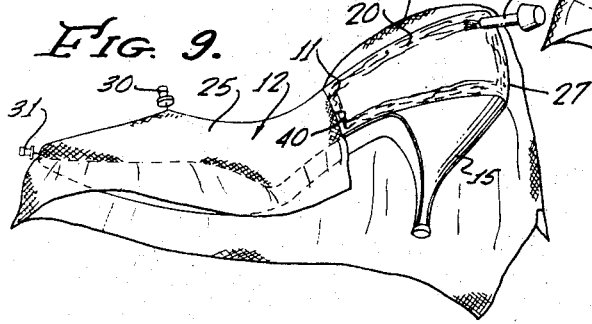
INVENTOR.
BETTE J. SHEARER
BY FOWLER, KNOBBE
& GAMBRELL
ATTORNEYS.

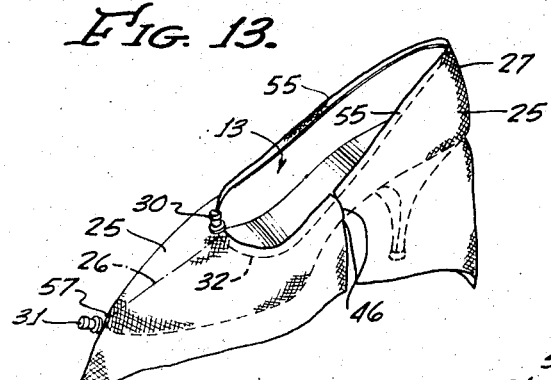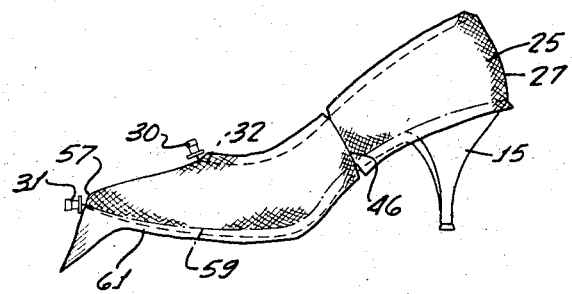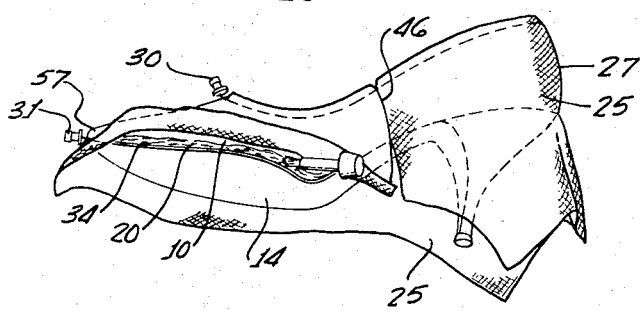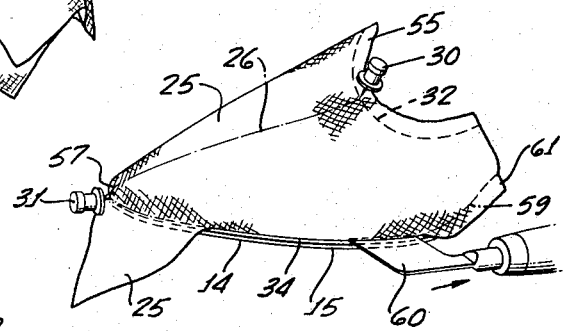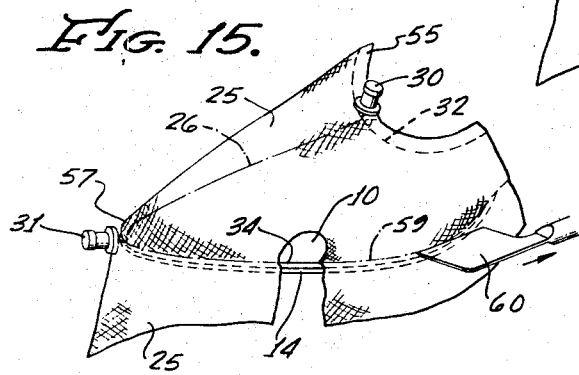

INVENTOR.
BETTE J. SHEARER
BY FOWLER, KNOBBE & GAMBRELL
ATTORNEYS.

Oct. 31, 1967 B. J. SHEARER 3,349,504
REMOVABLE COVERING FOR WOMEN'S SHOES
AND METHOD OF FORMING IT
Filed June 11, 1965 6 Sheets-Sheet 5
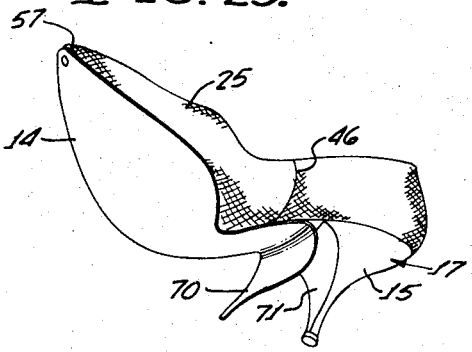
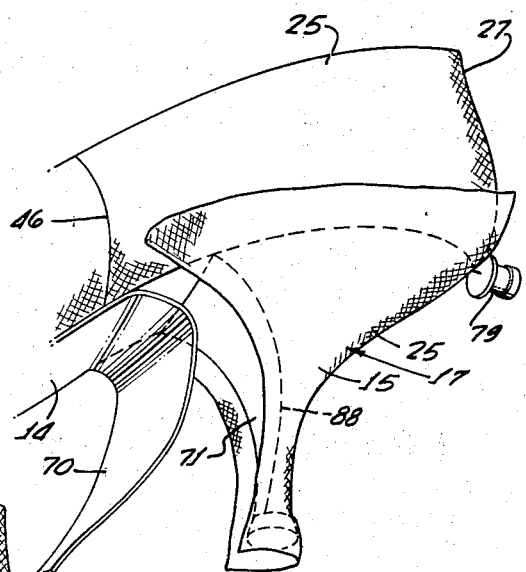
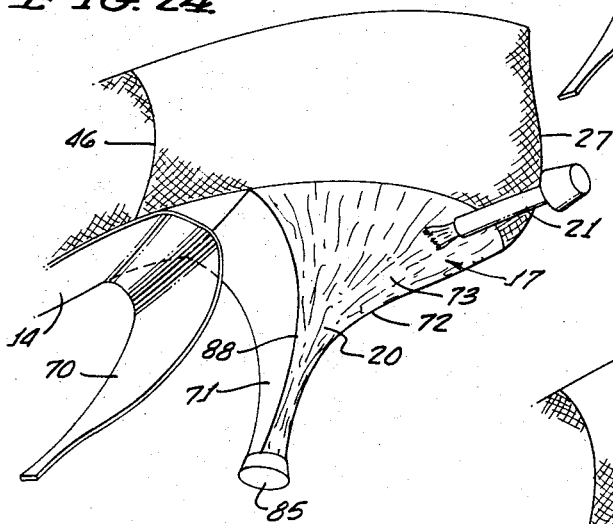
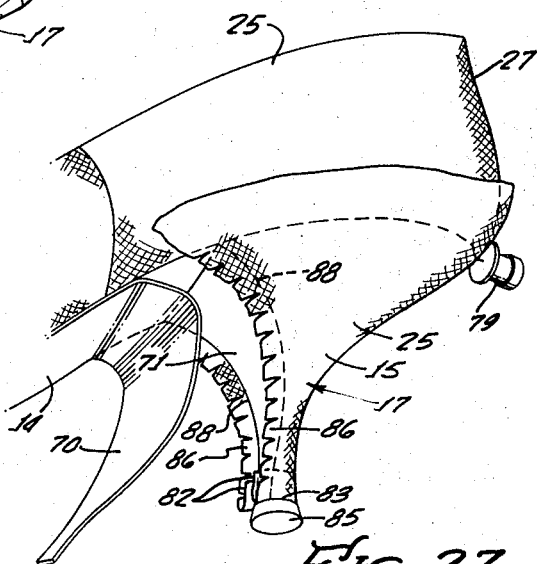
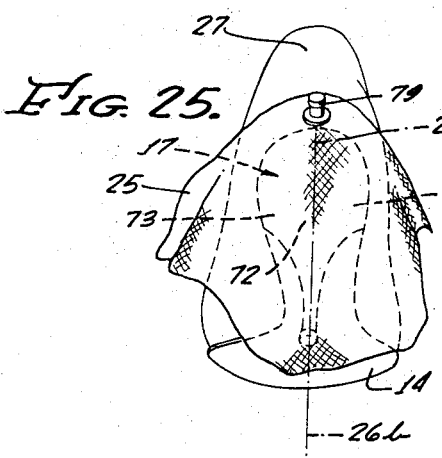
INVENTOR.
BETTE J. SHEARER
BY FOWLER, KNOBBE
& GAMBRELL
ATTORNEYS.

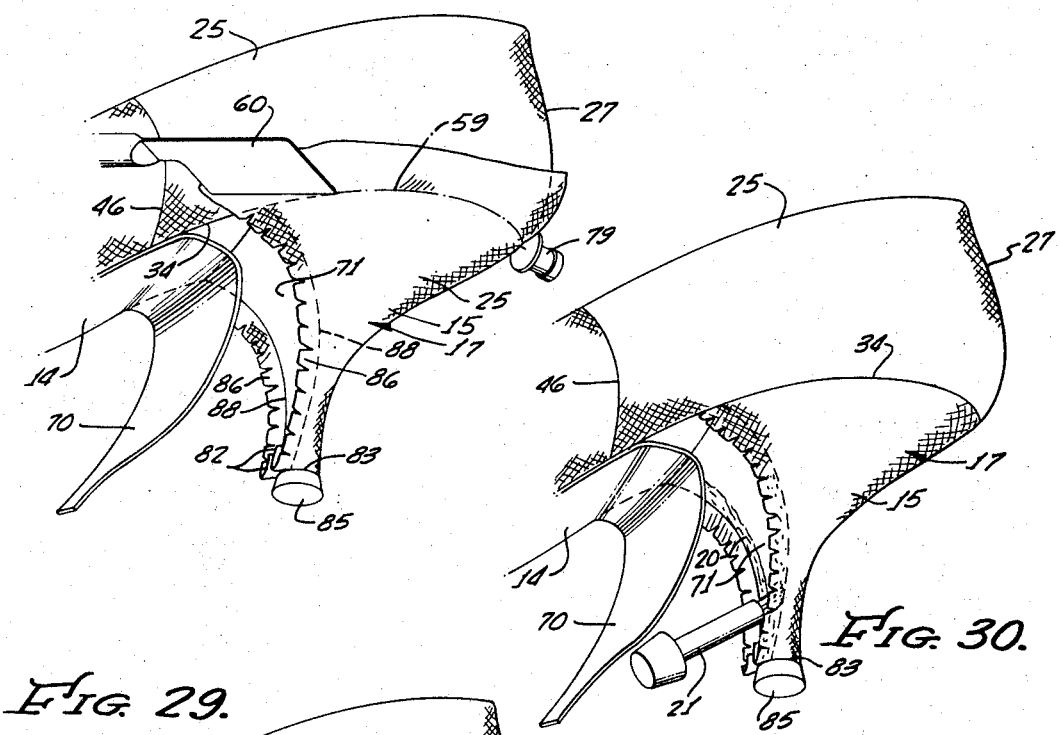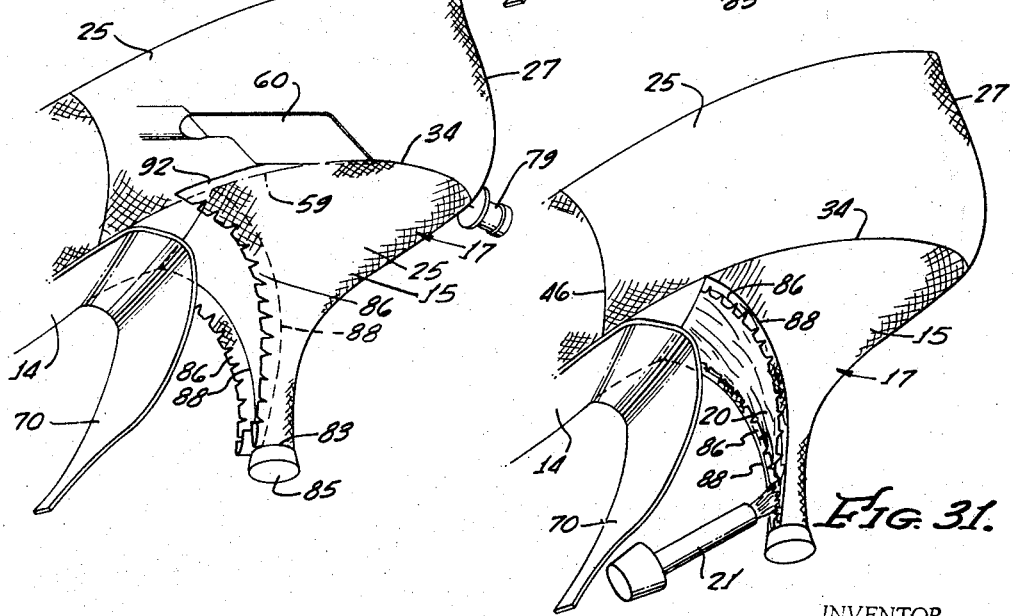

3,349,504
REMOVABLE COVERING FOR WOMEN'S SHOES AND METHOD OF FORMING IT
Bette J. Shearer, 6513 Via Lorenza,
San Pedro, Calif. 90732
Filed June 11, 1965, Ser. No. 463,104
18 Claims. (Cl. 36—2.5)

ABSTRACT OF THE DISCLOSURE

A removable cover is applied to a conventional lady's pump-type shoe without removing the sole or heel from the upper portion of the shoe. A tacky adhesive is applied to the toe and vamp area of the shoe exterior and a fabric is laid over it with the true bias extending along the longitudinal centerline of the shoe. The fabric is affixed to the toe and vamp area while pulling and easing the fabric to remove wrinkles. Adhesive is then applied to the remainder of the shoe working in sections backward from the toe and pressing the fabric to each newly cemented section while pulling and easing the fabric to remove wrinkles. The fabric is then trimmed and tucked into the groove between the sole and upper portion. The heel of the shoe is covered subsequently.

---

This invention relates to dress shoe covers and, more particularly, to removable fabric covers for the uppers and heels of ladies' shoes, and to a method of constructing and applying such covers to ladies' dress shoes.

Fashion conscious women often prefer to wear shoes and other accessories that complement their costume. Moreover, many demand that their shoes be designed specifically for each of their outfits.

If distinctive shoes are purchased for each wardrobe change, it is apparent that they often must be discarded long before they are worn out inasmuch as style is a transient phenomenon. The considerable expense involved in such purchases makes this approach impractical for most women. In addition, it is often difficult, if not impossible, to find shoes that carry out the particular pattern desired, for example, shoes covered with material which exactly matches the pattern of a dress.

From the foregoing, it can be appreciated that there is a considerable demand for satisfactory but inexpensive techniques which permit the appearance of ladies' shoes to be altered to set off a number of distinctive outfits. Witness to this fact is the popularity of kits which allow shoes to be dyed different colors for different occasions. For the technique to be acceptable where a new fabric is applied to the shoes, it must permit the covering to be done with a variety of materials, particularly with the same fabric that is used in the outfit. Women who make their own clothing are particularly conscious of coordinating their shoe pattern with a dress or other articles forming part of their ensemble.

Over and above the flexibility required of the materials that can be used, it is necessary that the method of covering the shoes be relatively easy to carry out so that the average woman can cover a pair of shoes without the expensive assistance of an expert.

The final product must not only be neat in appearance, but professional looking without unsightly fastening devices showing. In sum, the covered shoe must give the appearance of having been originally made with the cover on it. Naturally enough, this requires that the technique be applicable to virtually all women's shoes of more or less conventional construction.

The present invention overcomes many of the shortcomings of prior art efforts and avoids the deficiencies discussed above. The result is a covered shoe that is covered with a selected fabric which can be removed easily so as to permit a different cover to be applied without injuring the shoe.

Broadly speaking, in carrying out the method of this invention, a piece of fabric of the desired design or color is laid over the shoe with the true bias of the fabric oriented along the longitudinal axis or toe-to-heel plane of the shoe, the fabric is affixed to all but the inner seam area of the shoe body by working the fabric in two directions towards the seam to provide a smooth, wrinkle-free covering, a cover seam is formed overlying the normal arch side shoe seam, and the lower portion of the fabric is trimmed a short distance below the margin between the sole and the shoe's upper and forced therebetween. Throughout the process, the material is pulled, primarily transverse to the bias, to remove wrinkles and provide a professional looking finished shoe.

More specifically, in accordance with the present invention, the fabric is applied to the shoe body by applying a relatively non-bleeding adhesive or glue successively to small incremental areas of the body surface and pressing and smoothing the fabric over each successive area. The fabric is affixed to the shoe starting at the toe portion and working in directions around the sides of the shoe toward the side-seam of the shoe which is conventionally located on the arch side of the shoe. The excess material which gathers over the side-seam of the shoe is trimmed away before forming the generally vertical fabric seam. Thereafter, the lower edge of the fabric which has been trimmed is wedged between the upper and lower shoe portions starting at a point slightly behind the toe tip and working towards the back of the shoe. The material adjacent the toe tip is last to be trimmed and tucked in so as to minimize the stretching of the fabric which occurs when the fabric is pulled along its true bias.

While the basic approach to covering the upper part of the shoe can include the heel proper since these parts of the shoe are most often separately finished during the manufacturing of the shoe, it is most natural if the same apparent separation exists when the shoe is covered. The idea is to duplicate the original appearance, but with a cover of one's own choosing, not to change the structural appearance of the shoe. However, the heel may be covered easily by following the precepts applicable to the main body of the shoe, and in those cases where the heel is to appear as an integral part of the shoe body the entire shoe will be covered with a single piece of fabric.

To cover the heel separately, however, in the preferred embodiment the breasting is stripped away from the forward surface of the heel, a non-bleeding, tacky adhesive is applied to the rear and side surfaces of the heel, the fabric is pressed against the rear surface of the heel with the true bias of the fabric oriented vertically (in the toe-to-heel plane) and smoothed around the rear and side surfaces of the heel, the fabric is trimmed at its upper edge and wedged between the top of the heel and the upper portion of the shoe and trimmed at its forward edges and pressed against the forward surface of the heel, adhesive is applied to the forward surface of the heel and fabric thereon, and the breasting is re-attached.

The teaching of the present invention provides a lady's dress shoe having a removable cover comprising a shoe having an upper body defining an ankle opening, a sole attached to the lower of the shoe body and a heel affixed thereto, a coating of adhesive applied to the exterior surfaces of the shoe body and heel and a pre-selected fabric removably attached to the shoe body and heel with the true bias thereof lying generally in the toe-to-heel plane of the shoe and with the edges of the fabric adjacent the sole of the shoe being wedged in the grooves adjacent the sole and, in part, retained therein by the adhesive.

The broad method of removably applying a fabric cover to a lady's dress shoe without detaching the sole or heel therefrom comprising the steps of laying a covering fabric over the shoe body and the back of the heel body with the true bias of the fabric lying in the vertical heel in toe-to-heel plane of the shoe, affixing the fabric to the upper shoe portion and to the heel body with an adhesive by smoothing and kneading the material in directions generally away from the true bias of the fabric and wedging small excess edges of the fabric between the sole and the shoe body and the sole and heel body as the fabric is kneaded and smoothed to prevent wrinkles from being formed in the cover.

These and other objects, advantages and features of this invention will be more readily understood when the following detailed description is read with reference to the drawings in which:

FIG. 1 is a perspective view of a lady's right dress shoe covered in accordance with the principles of this present invention;

FIGS. 2–22 are perspective views of a shoe of the type illustrated in FIG. 1 showing successive stages in the process of covering the upper portion of a shoe by the method of this invention; and, FIGS. 23–31 are perspective views of a shoe of the type illustrated in FIG. 1 showing successive stages in the process of covering the heel of a shoe by the method of this invention.

Figure 18:
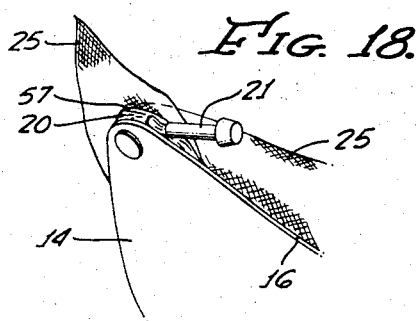

Before explaining the steps to be followed in covering a shoe in accordance with this invention, it is desirable to discuss briefly the characteristics of the adhesives which work best in covering shoes in accordance with the present invention. While a number of adhesives of one sort and another have been tried, the ones which appear to work best are rubber based cements which become tacky soon after application and remain so for a short period of time. If the adhesive takes too long to set up after its exposure to the air, it will "bleed" through many fabrics. At the same time, the adhesive must not set so quickly that time is not available to work out wrinkles in the fabric. Of course, if the adhesive sets up before a particular section of the cover is smoothed into place, a subsequent application of the adhesive may be made. It is for this reason that small sections of the shoe are covered rather than coating the entire shoe with the adhesive before beginning the covering operation.

One adhesive which has been found to work quite well is marketed by the Swift Company of Chicago, Illinois as its catalogue No. 7494 or 7218. The former uses a nonflammable solvent and is to be preferred, although the latter has comparable characteristics from the standpoint of set-up time and the like. Of course, any adhesive comparable to these will be found to work satisfactorily.

FIG. 1 shows an exemplary high-heeled lady's pump of conventional construction for wearing on the right foot. The shoe is of the full-vamp type having an upper 9 including a vamp 10 and a single side-seam 11 on the arch or inner side 12 of the shoe. The upper or shoe body 9 also includes an ankle opening 13. The lower portion of the shoe includes inner and outer soles 14 and 16 affixed to the upper 9 in any suitable manner and a heel 15.

Referring to FIGS. 2–22, the process of covering a shoe with a fabric can be followed through each stage. The process is begun as illustrated in FIG. 2 by applying adhesive material 20 to the forward or toe portion 22 of the vamp, for example, by using an applicator 21. A length of approximately 16 inches of normal yard good width of the chosen fabric 25 is then laid over the shoe (FIG. 3a). The fabric 25 is placed with its true bias (45° from the selvage) substantially along the longitudinal axis 26 of the shoe. The fabric 25 extends down both sides of the shoe and over the back 27 to completely cover the upper shoe portion.

The fabric 25 is affixed to the toe portion 22 of the shoe by pressing the fabric against the coating of adhesive. In attaching the fabric to the toe portion, the fabric is pulled and eased as necessary to conform it to the curvature of the major part of the toe.

A pair of push pins 30, 31 are used to hold the fabric in place while the shoe is being covered. One of the pins 30 is placed through the fabric into the throat portion 32 adjacent the ankle opening 13 and the other pin 31 is pinned into the groove or margin 34 between the sole 14 and the vamp 10 where they join at the tip of the toe 57.

A slit 37 is cut in the fabric along the true bias (FIG. 3b) to aid in shaping the fabric to the shoe and for the subsequent fitting of the cover inside the shoe. For average shoe sizes, the slit is formed to extend from about one inch behind the throat 32 for about three inches. However, the length of the slit is selected in accordance with the shoe size and can be made without the necessity of actually measuring it.

To cover the outer side of the shoe (the right side of the exemplary shoe), the fabric 25 is folded back to expose the outer side of the shoe (FIG. 4) and adhesive 20 is applied to the exposed portion from the toe portion 22 to the back of the shoe 27. The fabric 25 is then held adjacent the cemented side of the shoe with the side 38 of the fabric extending slightly below the heel 15 (see FIG. 5). The fabric 25 is hand pressed onto the cemented right side at this time. The fabric may be clipped below the soles 14, 16 as necessary to work out wrinkles. As the fabric 25 is applied, it is again pulled and eased to remove wrinkles and conform it to the outer surface of the shoe.

The shoe is turned over at this stage and covering of the arch side 12 of the shoe begun. The fabric 25 is pulled back along the inner side of the shoe and trimmed roughly at a point 40 to the rearward side of the side-seam 11. The fabric is then turned back to expose the arch side 12 (FIG. 6).

The adhesive 20 is applied to the vamp from the covered toe portion 22 around the side to the side-seam 11. The fabric 25 is thereafter pressed onto the cemented portion of the arch side (FIG. 7), pulling, easing, and clipping as necessary to work out wrinkles. Before pressing the roughly trimmed edge 40 to the shoe, it is neatly trimmed in alignment with the vertical side-seam 11 (FIG. 8).

Adhesive 20 is next applied to the remainder of the arch side 12 of the shoe, between the side-seam 11 and the back part 27 of the shoe (see FIG. 9). The fabric is pulled around the back of the shoe from the other side and pressed against the tacky surface on the arch side up to a point just short of the side-seam 11. A considerable amount of excess fabric will have accumulated over the side-seam 11, which is trimmed off leaving a sufficient margin 41 of material to extend about one-half inch forward of the side-seam 11 (FIG. 10).

The leading edge 43 of this margin 41 is then turned under, as at 44 (see FIG. 11), about one-quarter inch so that it will overlap the trimmed edge 40 at the side-seam 11.

Next the turned-under margin 44 is laid over the trimmed edge 40, and straight pins (not shown) are placed in the underlying fabric to mark the forward extent of the overlap. The turned-under margin 44 is then folded back again and a thin line of adhesive 20 is applied over the portion of the underlying fabric 25 to the rear of the straight pins and the margin 44 bonded in an overlapping position. The result is a neat overlapped seam 46 (FIG. 12). Push pins 48, 49 are inserted to hold the seam until the adhesive sets.

After the fabric is bonded around the vamp, sides and back of the shoe, it is trimmed around the ankle opening 13 leaving a margin 55 of approximately one-half inch extending over the opening (see FIG. 13).

The finishing of the lower part of the shoe upper 9 is begun by lifting the fabric 25 slightly at its lower edge and applying the adhesive 20 to a portion of the groove 34 formed between the sole 14 and the vamp 10. As shown in FIG. 14, the first area of the groove 34 to be cemented extends from about one inch back of the tip of the toe 57 rearwardly toward the overlapped seam 46.

The fabric 25 is then replaced over the groove 34. A wedging tool 60 (FIG. 15) having a relatively dull working edge is moved along the fabric over the newly cemented area and in the groove 34 to impress a score mark 59 on the fabric (a portion of the fabric over the groove has been cut away in FIG. 15 for purposes of illustration only). The fabric is pulled out of the groove and trimmed about one-eighth inch below the score mark 59 (see FIG. 16). The wedging tool 60 is then used to wedge the trimmed lower margin 61 of the fabric back into the groove 34 where it is held by the adhesive. As this step of wedging the material is performed, the fabric is pulled and eased to work out wrinkles on the vamp of the shoe. Any adhesive left on the exposed edge of the sole 14 can be removed carefully using acetone or another appropriate solvent.

The procedure shown in FIGS. 14–17 is continued around the shoe until only the portion of the groove 34 adjacent the tip of the toe 57 remains to be finished (FIG. 18). After the push pin 31 is removed, the forward part of the groove is finished in the same manner as described above and as illustrated in FIGS. 18 and 19. Care must be taken to work out the wrinkles and not stretch or distort the fabric since the wedging action here is along plane 26 coincident with the bias.

Figure 21:
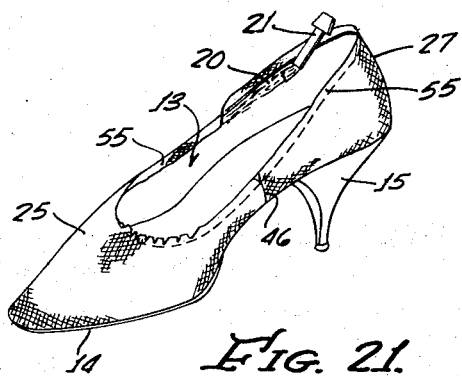
Figure 19:
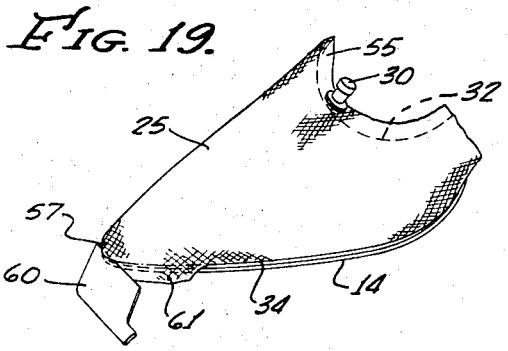
Figure 22:
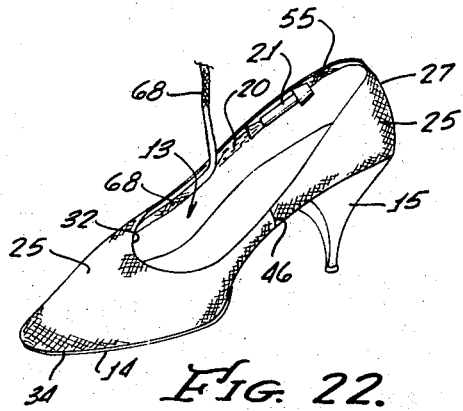
Figure 20:
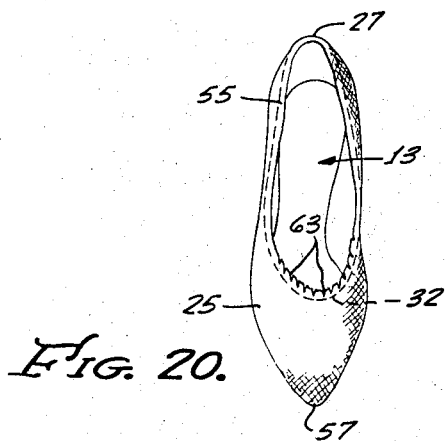

FIGS. 20–22 show the completion of the covering process around the ankle opening 13. The exposed edge of the fabric is cut adjacent the throat 32 to form a pinked edge (FIG. 20). The remainder around the sides and back of the upper 9 is cut to approximately one-half inch.

A narrow band of adhesive 20 is applied to the inside surface of the shoe just below the upper edge, as shown in FIG. 21, and the upper fabric margin 55 is folded in and bonded to the inside of the shoe.

Adhesive 20 is again applied to the outer surface of the folded-over margin 55 and a length of bias tape 68 (see FIG. 22) or other suitable finishing material placed over the edge of the margin 55 and held in place until the adhesive sets.

As an alternative to these latter finishing steps, the ankle opening 13 may be finished by prying the upper edge of the inner shoe lining loose from the outer shoe lining and cementing the upper margin 55 between the inner and outer linings. In most coverings, however, it is easiest and best to use the bias tape. It permits the cover to be removed easily in preparation for applying another fabric to the basic shoe. Of course, it will be obvious that the trimming and finishing around the ankle opening 13 may be done either before or after finishing the lower edge of the fabric.

This completes the covering of the upper of the shoe. Referring now to FIGS. 23–31, there are disclosed the steps in the process of covering the heel body using a small piece of the same fabric 25 which was used to cover the upper.

As shown in FIG. 23, the breasting 70 is pulled away from the forward surface 71 of the heel body 17 as a preliminary step. This may be done with the tool 60. Adhesive 20 is then applied to the rear surface 72 and side surfaces 73, 74 of the heel body 17 (see FIG. 24). A small piece of the fabric 25 is attached to the shoe along the back 27 by inserting a push pin 79 in the groove 34 where the heel body 17 joins the upper. The true bias of the fabric 25 is again located in a vertical position along axis 26b (in toe-to-heel plane 26), extending down from the pin 79 to the heel tap 85.

The fabric is then smoothed over the sides and back of the heel body 17 (FIG. 26), pulling and easing the fabric to work out wrinkles and conform the material to the surface of the heel body. The lower edge 82 of the fabric is turned up and under and bonded to the heel body surfaces, leaving a neat folded edge 83 adjoining the tap 85 adjacent the heel body 17.

The leading edges 86 of the fabric are pinked and trimmed to extend only a short distance beyond the forward edges 88 of the heel body. These edges 86 are serrated to aid in shaping them to the forward surface 71 of the heel body 17.

Referring to FIGS. 28 and 29, to finish the covering of the upper portion of the heel body 17, the fabric is scored with the tool 60 at the groove 34, trimmed to leave a small margin 92, and tucked into the groove 34 where it is held by the adhesive.

To cover the forward surface 71 of the heel body 17, a thin coat of adhesive 20 is placed thereon near the edges 88 (see FIG. 30), and the leading edge 86 of the fabric is pressed against the forward surface until the adhesive sets. The heel covering is then completed by applying adhesive 20 over the exposed fabric on the forward surface 71 of the heel body and to the surface itself (FIG. 31), and replacing the breasting 70.

By the foregoing method, the shoe upper and the heel are provided with a cover which is smooth and neat in appearance, and yet, may be easily removed as desired. The technique for applying the cover is easily mastered, and most common dress fabrics can be used as covering material.

Since the covering process is begun at the toe area 22 of shoes, a smooth appearance on this most noticeable portion of the shoe can be easily obtained. The appearance of the covered shoe is further enhanced by the use of only a single seam 46 on the arch side 12 of the shoe where it is least noticeable. Further, the particular form of overlapping seam 46 used presents a neat appearance. While many shoes have a seam at the back of the heel, this would not do for the covering since it would be difficult to match up the pattern of a patterned fabric at the heel. Any discrepancy would be quite noticeable. Such discontinuities at the inside seam are not readily apparent, however.

As the bias of the fabric material is aligned along the longitudinal axis of the shoe, the weave allows the fabric to be easily shaped to the curved surfaces of the shoe without permanently distorting the material. This shaping is further aided by the freedom of movement gained from the slit 37. Similarly, the shaping of the fabric to the curved surfaces of the heel body is aided by the orientation of the bias.

The lower margin 61 of the fabric is tucked into the portion of the groove 34 adjacent the tip of the toe 57 as a last step, otherwise the material can be stretched out of shape during the other covering steps. Small wrinkles may accumulate adjacent the toe tip 57, but they are small enough so that they can be worked toward the groove 34 where they can be eliminated or are at least not noticeable when the shoe is being worn.

Although the invention has been described with particular reference to a right shoe for convenience in illustration, it should be apparent that the same approach may be used to cover a left shoe. Further, the method is not limited to the particular shoe construction shown in the drawings. Moreover, it will be evident to one skilled in the art that the order of carrying out certain steps in the method is critical, while the order of performing certain other steps may be varied within the teaching of this invention. Thus, the above description and the drawings should be considered as exemplary, and the invention should be limited only by the following claims.

I claim:

1. A method of removably applying a fabric cover to a shoe without detaching the sole or heel therefrom comprising the steps of:

(a) laying covering fabric over the shoe body and the back of the heel body with the true bias of the fabric lying in the vertical heel-to-toe plane of the shoe;
(b) affixing the fabric to the upper shoe portion and to the heel body with a tacky adhesive by smoothing and kneading the material in directions generally away from the true bias of the fabric; and,
(c) wedging small excess edges of the fabric between the sole and the shoe body and the sole and heel body as the fabric is kneaded and smoothed to prevent wrinkles from being formed in the cover.

2. A method of removably applying a fabric cover to a shoe without detaching the sole or heel therefrom comprising the steps of:
(a) laying covering fabrics over the shoe body and the back of the heel body with the true bias of the fabrics lying in the vertical heel-to-toe plane of the shoe;
(b) affixing the fabric to the upper shoe portion and the heel body with a tacky adhesive by smoothing and kneading the material in directions generally away from the true bias of the fabrics;
(c) trimming the edges of the fabric covering the shoe body so that it extends a short distance below the margin between the sole and the shoe body and the edges of the fabric covering the heel body so that it extends a short distance above the margin between the heel body and sole; and,
(d) wedging the extended edges of the fabrics between the sole and the shoe body and the sole and heel body respectively as the fabrics are kneaded and smoothed to remove wrinkles from the cover.

3. A method of removably applying a fabric cover to a shoe without detaching the sole or heel therefrom in accordance with claim 2 including the additional steps of
(a) trimming the upper edge of the fabric adjacent the shoe body to leave only a small margin for folding over the edges of the shoe defining the ankle opening and the forward edge of the fabric adjacent the heel body so that it can be folded over the forward edges of the heel body for attachment thereto; and,
(b) pinking selected portions of the edge margins to permit the fabric to lie against the surfaces of the shoe and heel bodies without gathering or bunching.

4. A method of removably applying a fabric cover to a shoe without detaching the sole or heel therefrom in accordance with claim 2 and including the additional steps of
(a) temporarily stripping the breasting away from the heel so the edge margin adjacent the heel body will be affixed to the forward surface of the heel body underneath the breasting; and,
(b) bonding a bias tape to the inside of the shoe body overlying the edge margin of the fabric which is folded over the shoe body edges defining the ankle opening.

5. A method of removably applying a fabric cover to the upper portion of a shoe without detaching the sole or heel from the shoe body comprising the steps of:
(a) laying a covering fabric over the top of the shoe with the true bias of the fabric extending substantially along the heel to toe axis of the shoe;
(b) affixing the fabric to all but a small selected area of the upper shoe portion to be covered with a tacky adhesive by progressing from the vamp of the shoe in both directions toward the selected area while smoothing the fabric against the upper shoe portion to avoid the formation of wrinkles in the material;
(c) closing the cover of the shoe upper at the selected area by forming a seam overlying the selected area;
(d) trimming the lower edge of the fabric to extend a short distance below the margin between the sole and the shoe upper; and,
(e) wedging the lower edge of the fabric between the sole and the shoe upper as the fabric is kneaded and smoothed to remove wrinkles.

6. A method of applying a fabric cover to the upper portion of a lady's shoe without removing the sole and heel therefrom comprising the steps of:
(a) applying a coat of relatively non-bleeding adhesive to at least part of the exterior surface of the shoe upper including the toe and vamp area;
(b) laying a covering fabric over the top of the shoe with the true bias of the fabric extending substantially along the longitudinal axis of the shoe;
(c) adhering the fabric to the toe area while smoothing and kneading it to remove wrinkles;
(d) adhering the fabric to succeeding areas of the upper shoe portion by smoothing and kneading it to avoid wrinkles until only one pre-selected area of the upper portion remains uncovered;
(e) forming a neat seam which overlies and covers the selected area; and,
(f) tucking a small excess edge of the fabric into the groove formed between the sole and shoe body while smoothing and kneading the fabric to avoid forming wrinkles therein.

7. A method of applying a fabric cover to the upper portion of a lady's shoe without removing the sole and heel therefrom in accordance with claim 6 wherein the seam is formed by cutting the fabric to remove excess material gathered over the selected area, adhering the one edge of the fabric to the shoe body and folding the other edge before it is affixed to form the seam.

8. A method of applying a fabric cover to the upper portion of a lady's shoe without removing the sole and heel therefrom in accordance with claim 6 wherein the seam is formed vertically on the inner side of the shoe body and the edge of the fabric adjacent the tip of the toe is tucked into the groove after completion of the tucking operation for the other edges of the fabric.

9. A method of applying a fabric cover to the upper portion of a lady's shoe without removing the sole and heel therefrom in accordance with claim 6 and finishing the edge of the fabric adjacent the top part of the shoe comprising the additional steps of
(a) trimming the upper edge of the fabric to leave only a small upper margin extending beyond the edge of the ankle opening in the upper shoe portion;
(b) folding the upper margin over the top edge of the shoe body and into the ankle opening; and,
(c) bonding the margin to the interior surface of the shoe with tacky adhesive.

10. A method of applying a removable decorative cover to the body of a lady's shoe without removing the sole or heel, said method comprising the steps of:
(a) applying a coat of non-bleeding, tacky adhesive to the exterior toe and vamp area;
(b) laying a decorative fabric over the shoe with the true bias of the fabric extending substantially along the longitudinal axis of the shoe;
(c) temporarily pinning the fabric adjacent the toe area;
(d) affixing the decorative fabric to the toe area while smoothing and kneading the fabric to prevent wrinkles from forming over the toe and vamp area;
(e) slitting said fabric along the bias between the edges of the shoe defining the ankle opening;
(f) applying a coat of the adhesive to a second, relatively small area of the shoe body;
(g) affixing the decorative fabric to the second area while smoothing and kneading the fabric to remove the wrinkles;
(h) repeating steps (f) and (g) with succeeding small areas until only one selected area on the arch side of the upper portion remains uncovered;
(i) cutting the fabric to remove all but a small margin of the excess fabric extending over the selected area;

(j) adhering the portion of the fabric adjacent a first one of the cut edges to the selected area in a substantially wrinkle-free manner;

(k) turning the second of the cut edges under and adhering the fabric adjacent the second edge to the selected area with the turned edge extending over the first edge to form a straight overlapping seam in the selected area while smoothing and kneading the fabric to remove any wrinkles therefrom;

(l) applying a coat of adhesive to the groove formed at the junction of the sole and shoe body;

(m) trimming the lower edge of the fabric so it extends a slight distance below the groove; and (n) wedging the lower edge portion of the fabric into the groove by smoothing and kneading the fabric to remove wrinkles by progressing around the sides and back of the shoe body so as to wedge the fabric against the tip of the toe last.

11. A method of applying a removable fabric cover to the heel of a lady's shoe which has a breasting plate covering its forward surface without removing the heel from the shoe comprising the steps of:

(a) applying a non-bleeding, tacky adhesive to the rear and side surfaces of the heel body;

(b) laying a covering fabric over the heel with the true bias of the fabric extending substantially along the back edge of the heel body;

(c) applying the fabric to the rear and side surfaces of the heel body while smoothing and kneading the fabric to remove the wrinkles therefrom; and, (d) wedging a small excess edge between the upper edge of the heel body and the sole of the shoe.

12. A method of applying a removable fabric cover to the heel of a lady's shoe which has a breasting plate covering its forward surface without removing the heel from the shoe in accordance with claim 11 including the additional steps of (a) trimming and folding the lower edge of the fabric under to form a seam immediately adjacent the heel top; and (b) pinking the forward edges of the fabric adjacent the front surface of the heel body so that the edges may be tucked under the breasting plate without the fabric bunching or forming wrinkles in the part covering the rear and side surfaces of the heel body.

13. A method of applying a removable fabric cover to the heel of a lady's shoe which has a breasting plate covering its forward surface without removing the heel from the shoe comprising the steps of:

(a) stripping the breasting from the forward surface of the heel body;

(b) applying a non-bleeding, tacky adhesive to the exposed rear and side surfaces of the heel body;

(c) temporarily pinning the fabric adjacent the rear of the heel body with the true bias of the fabric extending downwardly along the back edge of the heel body;

(d) applying the fabric to the rear and side surfaces of the heel body while smoothing and kneading the fabric to remove wrinkles therefrom;

(e) trimming the fabric at its upper end so that it extends a slight distance above the groove between the top of the heel and the shoe sole;

(f) wedging the extended edge into the groove in contact with the adhesive;

(g) subsequent to step (d) and prior to step (h) wrapping the forward edges of the fabric around the forward edges of the heel body and affixing it to the forward surface of the heel body with adhesive;

(h) applying adhesive to the exterior face of the fabric on the forward surface of the heel body and to the forward surface thereof; and, (i) reattaching the breasting to the forward surface of the heel body.

14. A method of applying a removable cover to a conventional lady's pump-type shoe without removing the sole or heel from the upper portion of the shoe comprising the steps of:

(i) applying a coat of tacky adhesive to the toe and vamp area of the exterior of the upper portion of a shoe;

(ii) laying a decorative fabric over the shoe with the true bias of the fabric extending substantially along the longitudinal axis of the shoe and with all the edges of the fabric extending below the groove formed between the upper and lower portions of the shoe;

(iii) temporarily pinning the fabric to the toe area between the throat of the ankle opening of the shoe and the groove;

(iv) affixing the decorative fabric to the toe area by pulling and easing the fabric to remove wrinkles over the toe area;

(v) slitting the fabric overlying the ankle opening along the bias;

(vi) applying a coat of the adhesive to the outer side of the shoe from the toe area to the back of the shoe;

(vii) holding the fabric straight against the newly cemented area of the side;

(viii) pressing the fabric to the newly cemented area while pulling and easing the fabric to remove wrinkles;

(ix) pulling the fabric on the arch side of the shoe rearwardly from the toe area and cutting it substantially vertically a short distance rearward of the side-seam of the shoe;

(x) applying a coat of the adhesive to the portion of the arch side of the shoe between the toe area and the side-seam;

(xi) pressing said fabric against the cemented portion of the arch side while pulling and easing the fabric to remove wrinkles;

(xii) trimming the fabric portion applied in step (xi) neatly at the side-seam, the steps (ix) through (xii) being performed subsequent to step (v) and prior to step (xiii);

(xiii) pulling the portion of the fabric adjacent the uncovered portion of the arch side forward from the back of the shoe and cutting it substantially vertically a short distance forward of the side-seam;

(xiv) applying a coat of the adhesive to the uncovered portion of the arch side;

(xv) pressing the fabric against the newly cemented portion forward to a line slightly behind the side-seam of the shoe while working out wrinkles;

(xvi) folding under a small margin at the forward edge of the last applied fabric portion and adhering the margin in overlapping relationship with the portion of the fabric adhered to the arch side forward of the side-seam to form a neat overlapping seam;

(xvii) applying a coat of the adhesive to the groove formed between the lower and upper shoe portions;

(xviii) scoring the fabric by pressing it into the groove with a creasing tool;

(xix) trimming the fabric a short distance below the score marks;

(xx) tucking the lower edge portion of the fabric into the groove with the tool while pulling and easing the fabric to remove wrinkles by progressing around the shoe and tucking the tip of the fabric adjacent the toe in last;

(xxi) trimming the fabric to leave only a small upper margin extending beyond the edge of the ankle opening in the upper shoe portion;

(xxii) tucking the upper margin into the ankle opening and adhering it to the interior surface of the shoe, steps (xxi) and (xxii) being performed at any time subsequent to step (xvi);

(xxiii) temporarily removing the breasting from the forward surface of the heel of the shoe;

(xxiv) applying a coat of the adhesive to the rear and side surfaces of the heel;

(xxv) temporarily pinning a decorative fabric material to the shoe at the rear thereof above the top of the heel with the fabric extending down to the lowermost point to be covered on the heel, the true bias of the material extending vertically downward from the pin;

(xxvi) applying the fabric to the rear and side surfaces of the heel while pulling and easing the fabric to remove wrinkles;

(xxvii) trimming the fabric at its upper end leaving only a small margin of the fabric extending above the groove between the top of the heel and the upper shoe portion;

(xxviii) tucking the upper margin completely into the groove to adhere to the cement;

(xxix) subsequent to step (xxvii) and prior to step (xxx) adhering the forward edges of the fabric to the forward surface of the heel;

(xxx) applying adhesive to the exterior face of the fabric on the forward surface of the heel; and, (xxxi) re-adhering the breasting to the forward surface of the heel.

15. A lady's dress shoe of the type having a removable cover attached thereto comprising, in combination,
(a) a shoe having an upper body defining an ankle opening, a sole attached to the lower part of the shoe body and an extended heel affixed to the lower rear part of the sole;
(b) a coating of non-bleeding adhesive applied to the exterior surfaces of the shoe body and heel;
(c) a pre-selected fabric attached to the shoe body and heel with the true bias thereof lying generally in the toe-to-heel plane of the shoe;
(d) the edges of the fabric adjacent the sole of said shoe being wedged in the margins between the shoe body and sole and the heel and sole, respectively, and in part retained there by said tacky adhesive material;
(e) the upper edge of the cover on said shoe body being pinked and folded over the upper edge of the shoe body defining the ankle opening and bonded to the inside surface of the shoe body by said adhesive material;
(f) a length of bias tape affixed by said adhesive material in overlying relation of the edges of said cover which terminate interior of said shoe body; and
(g) the forward edges of the fabric covering the heel being pinked and trimmed and affixed to the forward surface of the heel by the adhesive so that the breasting normally covering the forward surface of the heel covers the forward edges.

16. In ladies' shoes of the type having an upper portion and a lower portion including a sole and heel, means for decoratively covering the upper portion and the heel thereof comprising, in combination,
(a) a coating of adhesive on the exterior surfaces of said upper portion;
(b) first and second pieces of fabric bonded to the entire exterior smooth surfaces of the upper portion and heel of the shoe by the adhesive, the true bias of the fabrics extending along the vertical toe-to-heel plane of the shoe;
(c) said first fabric having an overlapping seam formed by a turned-under margin of one edge of the fabric which overlays and is bonded to the other edge of the fabric by the same form of adhesive;
(d) the lower edge of said first and second fabrics being tucked into the grooves formed between said upper and lower shoe portions and the heel and sole, respectively, where they are held in place, partially, by the adhesive so that the fabrics may be stripped easily from the grooves without removing the sole or heel;
(e) the upper and forward edges of said first and second fabrics being folded over the edge of the shoe and into the ankle opening of the shoe and over the front edges of the heel, respectively, whereby the fabric coverings may also be removed from the ankle opening and forward surface of the heel without materially damaging the shoe or the fabric.

17. A lady's shoe and cover in accordance with claim 16 wherein the adhesive is non-bleeding, the overlapping seam is on the arch side of the shoe, and the breasting of the shoe covers the forward ends of the fabric affixed to the heel of the shoe.

18. A lady's dress shoe of the type having a removable cover attached thereto comprising, in combination,
(a) a shoe having an upper body defining an ankle opening, a sole attached to the lower part of the shoe body and an extended heel affixed to the lower rear part of the sole;
(b) a coating of non-bleeding adhesive applied to the exterior surfaces of the shoe body and heel; and
(c) a pre-selected fabric removably attached to the shoe body and heel with the true bias thereof lying generally in the toe-to-heel plane of the shoe;
(d) the edges of the fabric adjacent the sole of said shoe being wedged in the grooves adjacent the sole and in part retained therein by said tacky adhesive, and the uppermost edge of the fabric being bonded to the inside of the shoe body against the surfaces of the body which define said ankle opening.

References Cited

UNITED STATES PATENTS

| | | | |
|---|---|---|---|
| 1,804,430 | 5/1931 | Nutt | 12—147 |
| 2,483,016 | 9/1949 | Lussier | 36—9 |
| 3,012,341 | 12/1961 | Schaefer | 36—2.5 |
| 3,119,191 | 1/1964 | Vitzthum | 36—2.5 |
| 3,221,421 | 12/1965 | Liebmann | 36—2.5 |

PATRICK D. LAWSON, *Primary Examiner.*